April 2, 1968
O. E. SAARI
3,375,736
DIFFERENTIAL MECHANISM
Filed Sept. 15, 1966
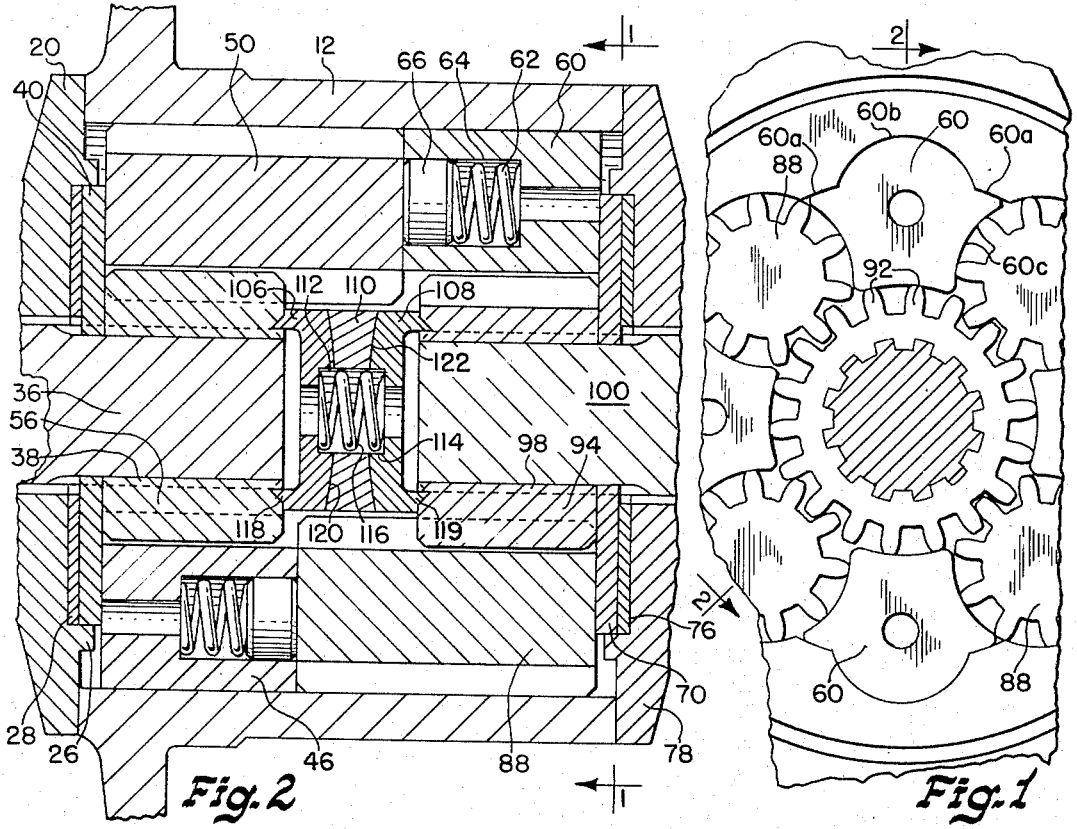
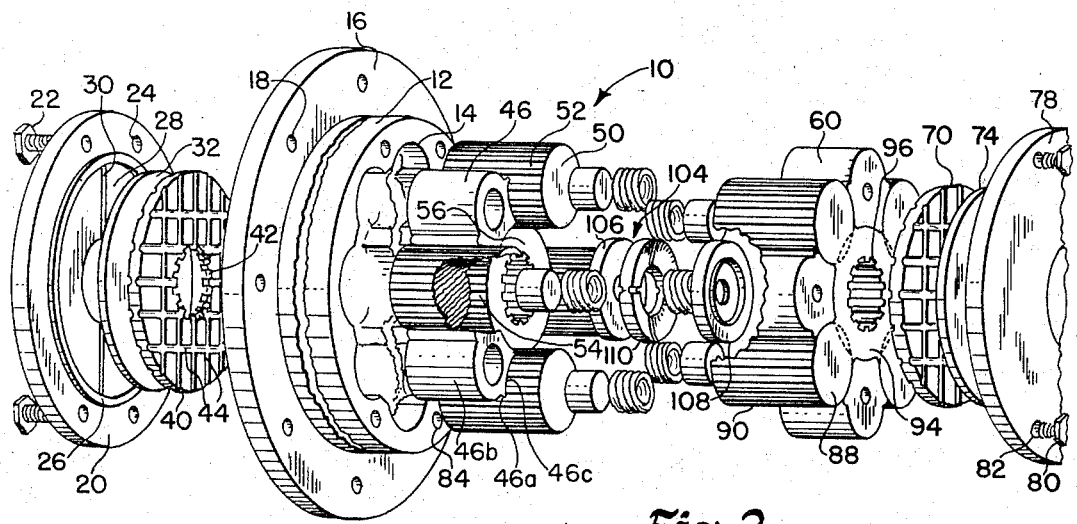
INVENTOR.
Oliver E. Saari
BY
Att'ys

United States Patent Office 3,375,736
Patented Apr. 2, 1968

3,375,736
DIFFERENTIAL MECHANISM
Oliver E. Saari, Elmhurst, Ill., assignor to Illinois Tool
Works Inc., Chicago, Ill., a corporation of Delaware
Filed Sept. 15, 1966, Ser. No. 579,733
14 Claims. (Cl. 74—711)

This invention relates to differentials of the planetary gear type and the structural means used to support the planet gears, and more particularly, to structural means which are adapted to be frictionally engaged by the planet gears to decrease the efficiency of the gears and provide a limited slip characteristic to the differential.

The transmission of the torque to drive wheels, generally two in number, so that each wheel can have a different speed of rotation relative to the other, requires the use of a differential mechanism. The differentiation between wheels which such a mechanism makes possible, provides for transmission of power to both wheels while the vehicle is turning a corner to permit relative motion between the wheels and yet eliminate what would otherwise be wheel bounce or skidding caused by unequal distances traveled by the two wheels. However, in permitting such differentiation under different relative wheel speeds, conventional differentials also permit one wheel to spin if that wheel possesses relatively less tractive ability (such as provided by ice or mud) than that of the other drive wheel. The total tractive ability of the vehicle is then essentially limited to the tractive effort of the least tractive wheel.

Conventional differentials usually comprise a pair of side gears connected to the axles, and a pair of bevel gears mounted in the differential case and positioned between, and in mesh with, the side gears. The manufacture of such differentials requires the performance of several machining operations. One particularly expensive operation involves the machining and finishing of spherical surfaces on the back face of the bevel gears and on the interior portions of the case which support the bevel gears.

Due to the characteristic efficiency of such bevel gear differentials (approximately 90%), in transmitting torque between the two axles, it has been found desirable to add various types of elements to them to reduce the efficiency of the differential gears.

Many methods and means of reducing the efficiency of the gearing or otherwise restricting relative rotation under slipper conditions have been developed. Examples would include systems which completely lock the wheel having the least tractive ability, systems where the differential gears are locked for movement with their case when the relative movement between the gears and case exceeds a predetermined amount, and the use of overrunning clutching means to introduce friction in various ways. Generally, the more sophisticated devices have not found widespread application in differential construction because of the added expense of using special manufacturing techniques in producing a complicated design. The most economically practical devices presently available utilize friction clutches which commonly have a relatively short usable life since they wear quite rapidly and are difficult to lubricate properly. Another deficiency of bevel gear systems is that they are relatively noisy and when coupled with friction clutches, often require special lubricants to reduce noise or chatter.

Accordingly, it is an object of this invention to provide a differential which is reliable, long lasting, quiet in its operation, and economical to manufacture.

Another object of this invention is to provide a simple and inexpensive differential of a spin limiting sort tending to reduce relative motion between two axles when the wheels on the axles engage surfaces of widely differing coefficients of friction—without impairment to efficient transmission of power in the absence of differentiation requirements.

A still further object of this invention is to increase the spin limiting properties of a differential of the type disclosed in co-pending application, Ser. No. 363,934, filed Apr. 30, 1964, now Pat. No. 3,292,456 wherein inefficiency is derived from the friction caused by mounting the pinions loosely in bearing pockets.

Another object of this invention is to provide a differential which has pinion engaging insert members for absorbing the wear produced by frictional engagement with the gears of the differential.

Another object of the invention is to increase the spin limiting properties of a differential having spring biased pinions such as is disclosed in copending application Ser. No. 579,730 filed on the same day as the present application in the name of Gary Vesey.

Yet another object of this invention is to provide a differential of the spin limiting sort which is capable of accommodating a large amount of wear and manufacturing tolerances with a very small loss of inefficiency.

A further object of this invention is to provide a differential having a large amount of friction bias effect caused by a relatively small compressive force.

These and other related objects are achieved in the present invention by the use of pinion supporting insert members and biasing means such as spring members in differentials of the side or sun gear and meshing pinion or planetary gear variety, the insert members being capable of being made of powder metal and hardened prior to assembly and the spring members being mounted relative to the gears so as to exert an axial compressive force thereon and thus oppose the rotation of the gears relative to the differential case which supports them.

The present invention is broadly related to the invention set forth in great detail in the previously referenced applications assigned to a common assignee, in that in both cases, friction and rubbing are relied upon to increase the inefficiency of a differential. In the instant invention, the frictional force available for providing limited slip properties is increased by resilient axial compressive force to the gears, such as by the use of spring members, to cause one or more of them to rub on their ends against a friction member. Since spring dimensions and properties can be chosen which will exert different degrees of compressive force, it is obvious that the inefficiency of the differential can be varied over a large range. Although the applications previously referred to, show several types of inefficient differential devices, the present invention permits a substantial increase to be made in the ineffciencies of such differentials.

When an axial bias is applied to any of the gears in the differential of the present invention, the gears become frictionally engaged on their end faces. Since the coefficient of friction is much greater when the gears are stopped as compared to when they are moving, it can be seen that the present differential will prevent one wheel of a vehicle from moving relative to the other until a predetermined break-away torque is exceeded. Thus, when a vehicle is just starting to move out of a location where one wheel is in engagement with a surface offering little resistance to slip, a large amount of torque can still be transferred to the other wheel to help get the vehicle moving.

Although the use of springs to increase the limited slip properties of a differential is contemplated in a preferred embodiment of the invention, the differential would have a certain degree of limited slip properties even without the springs due to the fact that the pinions are loosely mounted in frictional engagement with their bearing pockets. The bearing pockets are defined by the scalloped inner wall of the differential case and the surfaces of a plurality of support members or shoes which space the pinions in one orbit from each other and cause portions of the pinions in one orbit to be axially separated from portions of the pinions in a second orbit.

Even without considering limited slip capabilities, the invention has distinct advantages in reducing the amount of machining required, and therefore the cost of many of the parts used in a differential. The differential case of the present invention has a scalloped, longitudinally extending, interior surface which can be formed in any number of various ways such as by broaching, or milling, or molding, for example. Although a portion of the radial loads produced by the pinions may be absorbed by the scalloped surface of the case, the major portions of such loads are absorbed by the support member inserts which can be made quite economically of powder metal and hardened separately from the case. With most of the radial forces of the pinion teeth being absorbed by the hardened insert members, it is possible to have a differential case which is not as hard as the inserts. If desired, the insert members could also be fashioned so as to completely form the inside surfaces of the differential case, and thus permit the differential case to consist only of a ring member which offers outer support for the inserts. Such inserts would eliminate the need for machining operations on the ring. The pinion gears, and a friction plate which can be placed to receive axial pinion loads, can be formed economically of powder metal and hardened if desired.

The present invention generally comprises a rotatable differential case which encloses a pair of coaxial sun or side gears each of which is engaged by a set of planetary pinion gears. The set of pinions which drives one side gear is in meshing relationship with the set of pinions driving the other side gear so as to permit the side gears, and the axles connected to them, to be rotated in opposite directions. The limited slip properties of the differential are enhanced by inserting a hardened support member in line with each pinion and biasing the pinion and support members axially away from each other and into contact with a pair of friction plates rotating with the side gears. Besides serving a function of axially positioning the pinions and exerting an end thrust on the friction plates, the pinion support members also absorb the radial force of the pinions which is produced when torque is introduced into the case. In addition to the friction derived from the engagement of the pinions and support members by the friction plates, the differential also derives friction from the rubbing of the friction plates on the end cover of the differential case, either directly or through an intermediate wearplate. The normal force which produces the latter type of friction can be increased over that caused by the biased pinions and support members by applying a spring bias force between the side gears.

Further detailed description of the invention can be had by reference to the drawings in which:

FIG. 1 is an end view with the right cover and friction and wear plates removed taken along lines 1—1 of FIG. 2.

FIG. 2 is a side section of the invention shown in FIG. 1, this section taken along lines 2—2 of FIG. 1.

FIG. 3 is an exploded assembly of the component parts of the invention shown in FIGS. 1 and 2.

Referring to the drawings, and particularly to FIGURE 3, the differential 10 includes a rotatable differential case 12 having a plurality of internal escalloped wall portions 14, for supporting a plurality of pinions and support members to be described later. On the exterior of the differential case 12, a ring gear support flange 16 is formed. The flange 16 includes holes 18 for the attachment of a suitable ring gear (not shown). The teeth of the ring gear would receive the engine torque which the differential would then transmit to a pair of axles 36, 100 connected to it. It is to be understood that a ring gear would be merely representative of one form of gearing which could be used to transmit torque. In addition to gearing, it would, of course, also be possible to employ other methods of transmitting power to the differential case 12 such as by belts and pulleys for example. Although not shown, since it forms no part of the present invention, the case 12 would include external bearings on its ends for mounting the case for rotation in a differential housing (not shown).

On the left end of the differential 10 there is a cover 20 which is attached to the differential case 12 by means of cover bolts 22 which pass through holes 24 in the cover 20 and are threaded into the case 12. The cover 20 includes an integral annular portion 26 which fits inside the escalloped walls 14. The annular portion 26 encompasses a recessed portion 28 which may have oil grooves 30 therein for carrying lubricant to the outer surface of a wear plate 32 which is mounted in the recess. An enlarged hole 34 in the wear plate 32 permits the wear plate to be freely rotatable relative to left axle 36.

Axle 36 has splines 38 formed on its inner end which pass through a left friction plate 40 and are in driving engagement with a splined hole 42 in the friction plate. A plurality of oil grooves 44 are formed in friction plate 40 for carrying lubricant to the friction surfaces on either side of the plate. The plate 40 is frictionally engaged by a plurality of left end pinion support insert members 46.

The insert members 46 are axially slidable relative to differential case 12 in the grooves defined by the escalloped wall portion 14. It is not necessary to positively attach the support members 46 to the grooves formed by the wall 14 since the support members are formed with ear portions 46a and a circular support surface 46b which cooperate with the identically contoured surface of wall portion 14 to prevent rotational or transverse displacement of the support members relative to the wall 14 when pressure is applied thereto at a non-radial point such as 46c by the pinions 50.

A set of left pinions 50 are mounted in an orbit so as to have their left ends in engagement with friction plate 40 and a portion of the axial length of their teeth 52 in friction engagement with the insert members 46. Pinion teeth 52 are in meshing engagement over substantially the same portion of their axial length with left side gear teeth 54 formed on left side gear 56. Side gear 56 has internal splines 58 which mesh with splines 38 on axle 36 and cause the side gear to rotate positively with the axle.

A plurality of right end pinion support insert members 60 (identical to members 46) are arranged in axial alignment with left end pinions 50 and are biased away from said pinions by insert springs 62 which are mounted in insert recess 64 so as to apply an axial force against the ends of the pinion 50 by means of an insert button 66. The right end pinion support members 60 include surfaces 60a, 60b, and 60c similar to the corresponding surfaces 46a, 46b, and 46c on left support member 46. The springs 62 cause the pinions 50 to frictionally engage the left end friction plate 40 while causing the right end support members 60 to frictionally engage the right end friction plate 70. The outer end of the right friction plate 70 engages a right end wear plate 74 which is loosely received in a recessed portion 76 in right end cover member 78. The right end cover 78 is held to the differential case 12 by suitable means such as cover bolts 80 which pass through holes 82 in the cover and are threaded into holes 84 in the case 12.

A plurality of right end pinions 88 are positioned in an orbit in alternate grooves in wall 14. Right end support members 60 are located between the pinions 88. Each of the pinions 88 and support members 60 is in frictional engagement at its outer end with the friction plate 70.

The right end pinions 88 have pinion teeth 90 which are in meshing engagement over a portion of their axial length with teeth 92 on right side gear 94. Splines 96 on side gear 94 mesh with splines 98 on right axle 100 to cause the side gear and axle to rotate together.

The side gears 56 and 94 are held spaced from each other in the region where pinions 50, 88 are in mesh with each other by means of a side gear aligning and separating assembly 104 comprising left, right, and center separation members 106, 108, 110 respectively. The left and right separation members 106, 108 includes recesses 112, 114 respectively for receiving a spring 116 which biases the side gears 56, 94 away from each other. Integral rings 118, 119 are formed on the outer surfaces of separation members 106, 108 for engaging the chamfered inner ends of the side gears 56, 94 to align the side gears with each other and restrain the separating assembly 104 against movement into contact with the pinions 50, 88. The outer separating members 106, 108 also include radial surfaces 120, 122 which contact a complementary shaped surface on the center separating member 110 to prevent eccentric movement of member 110 relative to the rest of the separating assembly 104.

The pinion support members 46 and 60 are identical in shape and are preferably made from powdered metal. Because the support members are designed so as to be insertable into the differential case, it is possible to harden them individually before they are assembled into the case. The pinion gears 50, 88 and the friction plates 40, 70 may also be made of powdered metal and hardened before assembly to the differential. Since the friction absorbing members are separately hardened before they are inserted in the case, the differential case 12 can have a less hardened surface. Since the interior surfaces 14 of the case are straight, they are easily shaped by conventional machine operations, or, depending on their size, they may be formed with a finished surface by a molding process such as powder metal.

The pinion biasing springs 62 and the side gear separating spring 116 are preferably helical springs which can, for example, provide a pre-load of 100–200 pounds when fully compressed to a length about .125 inch less than their free length. The differential is particularly adapted to automotive use where a torque bias in the range of 50–250 foot pounds acting to prevent one axle from rotating relative to the other has been found sufficient to provide adequate limited slip properties.

The capacity of the differential for exerting a torque bias is greatly enhanced by the fact that the friction plates 40, 70 develop friction forces on each of their sides at a substantial distance from the axle so that the torque produced by the friction forces is much greater than it would be if the friction were applied by the ends of the pinions directly to the differential case. If a spring washer were used, for example, to apply an end thrust to the case, the resisting moment produced would be equal to the normal force exerted by the washer multiplied by the distance between the axis of the washer and the point at which the washer contacts the differential case. In the instant invention, the moment arm is much greater since it is equal to the distance between the axis of the axle and the point at which the friction plate splined to the axle receives the normal force from the pinion. Furthermore, as previously mentioned, the total torque produced by the friction plates arises not only from the friction contact of the pinions with the friction plates but also by the friction contact of the friction plates with the wear plates 32, 74 (or by the wear plates with the case 12 when the wear plates are rotating with the friction plates).

The differential will retain its limited slip characteristics for an extremely long time since the helical springs 62 will exert a force until they are fully extended from their .125 inch compression. Since the force produced by a spring varies with the extent to which it is compressed, an extension of the spring of only .005 inch from its fully compressed length caused by parts tolerances, or wear would reduce the compressive force exerted by the springs by only 4 percent (.005/.125). This 4 percent loss in compressive force would compare to a 50 percent loss in a spring washer type of arrangement where a spring washer which requires a .010 inch movement to fully compress it becomes extended by .005 inch due to tolerances or wear.

Although friction plates 40, 70 could bear directly on the end covers 20, 78, it has been found desirable to insert wear plates 32, 74 between the friction plates and the end covers. The wear plates serve to prevent scoring and tearing of the metal in the friction plates and end covers since any time there is a tendency for the wear plate to be frictionally seized by a member rotating relative to it, it will commence to rotate with that member and slip relative to the other member before sufficient torque can be applied to it to cause scoring or tearing to take place.

While my invention has been illustrated and described with reference to a preferred embodiment thereof, it will be understood by those skilled in the art that various changes in form and details may be made therein without departing from the spirit and scope of my invention.

I claim:

1. A differential comprising:
   a rotatable differential case;
   a pair of side gears in said case adapted to be operatively engaged by a pair of axles entering opposite sides of said case;
   a plurality of first pinion gears in a first orbit in meshing engagement with one of said pair of side gears;
   a plurality of second pinion gears in a second orbit in meshing engagement with the other of said pair of side gears;
   at least one of said first pinions being in meshing engagement with at least one of said second pinions;
   a first plurality of support members insertable in said differential case, and adapted to be positioned in axial alignment with one end of the pinions in said first orbit and in radial frictional engagement with the teeth of the pinions in said second orbit;
   a second plurality of support members insertable in said differential case, and adapted to be positioned in axial alignment with one end of the pinions in said second orbit and in radial frictional engagement with the teeth of the pinions in said first orbit;
   each of said first and second support members having pinion supporting surfaces on one side thereof and case contacting surface portions on the other side thereof, said case contacting portions being cooperable with complementary shaped interior surfaces of said case to prevent rotation or displacement of said support members when one side of said members are subjected to said radial frictional engagement by said pinions;
   said pinions, and the support members they are adapted to be radially engaged with, being mounted relative to each other so that the teeth of said pinions will bear on said support members with an increasing frictional force as the torque transmitted by the pinions increase.

2. A differential according to claim 1, and further including:
   at least one friction plate means in said differential case mounted for movement relative to said case;
   said friction plate means being adapted to be frictionally engaged by at least the pinion gears in one of said orbits.

3. A differential according to claim 1 wherein said support members are made of powdered metal and are hardened prior to assembly in said differential case.

4. A differential according to claim 1 wherein said differential case includes a rotary carrier member having a plurality of escalloped, substantially cylindrically walled channels for receiving and radially supporting said pinions and support members.

5. A differential according to claim 2 wherein said friction plate means comprises:
a friction plate member movable simultaneously with the movement of one of the side gears relative to said case;
said friction plate member having an inner side in frictional engagement with the pinions in at least one of said orbits and an outer side in frictional engagement with said differential case;
said friction plate member being in positive driving relationship with an axle entering said case and adapted to receive torques applied by said axle and dissipate them in the form of friction forces at the points of frictional engagement with said pinions and case.

6. A differential according to claim 5 wherein said friction plate member is made of a hardened material positioned at one end of the differential case between one of the side gears and an end surface of said case;
said friction plate member and side gear being internally splined for engagement with a complementary shaped axle; and
a bearing plate mounted for free rotation in the end of the case for contacting said friction plate, said bearing plate being adapted to rotate relative to either said friction plate member or said case whenever excessive friction forces exist between it and said case or friction plate respectively, whereby to prevent scoring.

7. A differential according to claim 6 wherein said friction plate member has a plurality of grooves in at least one of its surfaces for permitting lubrication thereof.

8. A differential according to claim 7 wherein said friction plate has grooves formed in each of its surfaces for permitting lubrication of said pinion ends and said bearing plate.

9. A differential according to claim 5 wherein friction plate means are located at each end of the differential case.

10. A differential according to claim 5 and further including spring member means for biasing said pinions axially against said friction plate.

11. A differential according to claim 10 wherein said means for biasing comprises springs located in holes in said support members.

12. A differential according to claim 1 wherein separating means are actually positioned between said side gears for aligning said side gears and spacing them from each other in the region where said first and second pinions mesh.

13. A differential according to claim 12 wherein springs are inserted internally of said separating means to bias said side gears into frictional contact with said friction plate member.

14. A limited slip differential comprising:
a rotatable carrier member;
a pair of differential case end portions attached to said carrier member;
a plurality of escalloped, substantially cylindrically walled channels on the inner surface of said carrier member;
a plurality of first pinion gears in a first orbit positioned in alternate channels near one end of said carrier member;
a plurality of second pinion gears in a second orbit positioned in the remainder of said channels near the other end of said carrier member;
said first and second pinion gears being in meshing engagement with each other at the center of said carrier member;
first and second side gears in meshing engagement with said first and second pinion gears respectively at the ends of said carrier member;
separating and aligning means positioned coaxially with said side gears for aligning said side gears and preventing them from entering the region where said first and second pinions mesh with each other;
a plurality of first and second hardened insert members positioned in said channels in alignment with said first and second pinion gears respectively;
preloaded resilient springs operatively associated with said insert members for forcing said insert members and the pinions aligned therewith toward said opposite end portions of the differential case;
said first and second insert members being shaped so as to radially support said second and first pinions respectively and to frictionally engage the teeth thereof;
wall contacting portions formed on said inserts cooperable with said escalloped channels for permitting said inserts to move longitudinally relative to said channels while preventing displacements in other directions when said inserts are in operative engagement with the pinions;
first and second friction end plates mounted for rotation with said first and second side gears respectively; and
separating means positioned between said side gears for spacing said side gears from each other resiliently biasing said side gears toward the opposite end portions of the differential case;
said friction end plates being in rubbing frictional engagement with said pinions, insert members, and side gears on one surface thereof and in rubbing frictional engagement with the difference case end portions on another surface thereof.

References Cited

UNITED STATES PATENTS

| 1,203,085 | 10/1916 | Wallace | 74—710.5 |
| 1,229,548 | 6/1917 | Van Sant et al. | 74—711 |
| 2,786,366 | 3/1957 | Tallakson | 74—711 |
| 2,821,096 | 1/1958 | Lyeth | 74—711 |
| 3,060,765 | 10/1962 | Rinsoz | 74—710.5 |
| 3,097,545 | 7/1963 | Immel | 74—711 |

FOREIGN PATENTS 888,808  9/1953  Germany.

FRED C. MATTERN, Jr., *Primary Examiner.*

ARTHUR T. McKEON, *Examiner.*